United States Patent [19]

Sievers et al.

[11] Patent Number: 4,556,376
[45] Date of Patent: Dec. 3, 1985

[54] EXTRUDER HEAD FOR PRODUCING FLAT COHESIVE PROFILED WEBS FROM RESILIENT MIXTURES OF DIFFERING COMPOSITION

[75] Inventors: Willi Sievers; Hartwig Schlüter, both of Korbach; Gerhard de Vries, Garbsen, all of Fed. Rep. of Germany

[73] Assignee: Continental Gummi-Werke Aktiengesellschaft, Hannover, Fed. Rep. of Germany

[21] Appl. No.: 625,598

[22] Filed: Jun. 28, 1984

[30] Foreign Application Priority Data

Jul. 11, 1983 [DE] Fed. Rep. of Germany ....... 3325017

[51] Int. Cl.$^4$ ............................................. B29F 3/04
[52] U.S. Cl. .............................. 425/133.5; 264/171; 425/131.1; 425/462
[58] Field of Search ............... 425/130, 131.1, 133.5, 425/462, 465, 113; 264/171, 177 R, 146, 210.2

[56] References Cited

U.S. PATENT DOCUMENTS

| | | | |
|---|---|---|---|
| 3,486,195 | 12/1969 | Greenwood et al. | 425/131.1 |
| 3,584,343 | 6/1971 | Kohlepp et al. | 425/131.1 |
| 4,204,821 | 5/1980 | Gauchel et al. | 425/131.1 |
| 4,336,012 | 6/1982 | Koch et al. | 425/131.1 |
| 4,348,346 | 9/1982 | Thompson | 425/131.1 |
| 4,358,261 | 11/1982 | Ohki | 425/131.1 |

FOREIGN PATENT DOCUMENTS 651974 3/1979 U.S.S.R. .......................... 425/131.1

Primary Examiner—Jay H. Woo
Assistant Examiner—J. Fortenberry
Attorney, Agent, or Firm—Becker & Becker

[57] ABSTRACT

An extruder head for producing flat cohesive profiled strips from resilient mixtures of differing composition, such as mixtures of rubber or synthetic material, and especially for manufacturing uncured tread strips for pneumatic tires having a two-ply central portion and two similar edge portions. The extruder head includes two extruders which are disposed at an acute angle next to or above one another, and feed a common extrusion nozzle via a preform die or member having flow channel which extend one above the other. The extruder head also has a third extruder which conveys the mixture for the edge portions and is connected to the preform die at a greater angle than are the aforementioned extruders. The flow route of the third extruder in the preform die, starting from its connecting bore, is initially guided as a single connecting channel to a direction-changing angle piece in the central region above or below the flow channels associated with the other two extruders, and from there is split into two branch channels which span the connecting channels, are essentially of equal length, and in their edge regions end in edge channels which lead into the edge portions of the profiled strip.

4 Claims, 4 Drawing Figures

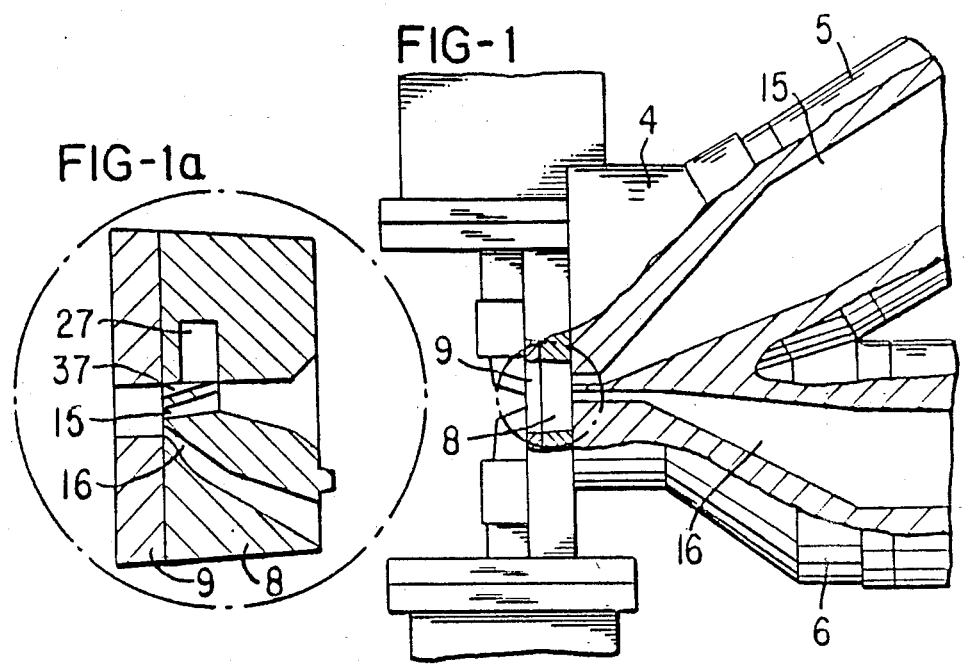
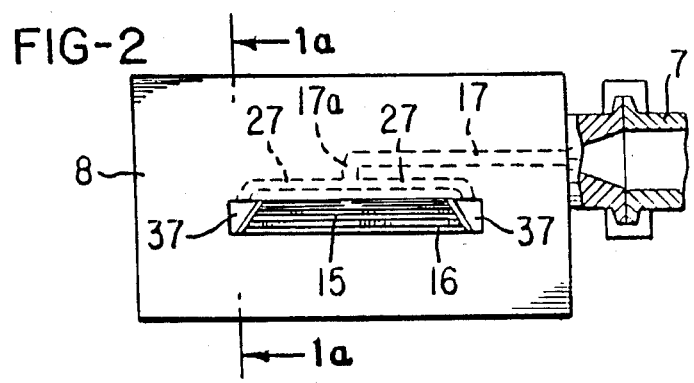
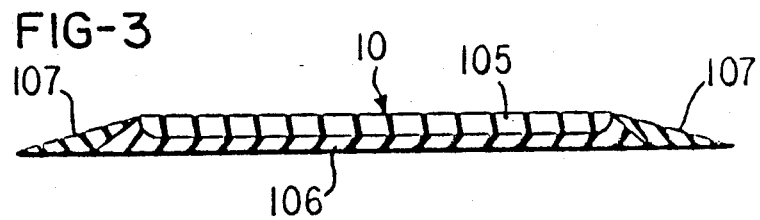

EXTRUDER HEAD FOR PRODUCING FLAT COHESIVE PROFILED WEBS FROM RESILIENT MIXTURES OF DIFFERING COMPOSITION

BACKGROUND OF THE INVENTION

1. Field of the Invention

The present invention relates to an extruder head for producing flat cohesive profiled webs from resilient mixtures of differing composition, such as mixtures of rubber or synthetic material, and especially for producing uncured tread strips for pneumatic tires having a two ply central portion and two similar edge portions. The extruder head includes two extruders which are disposed at an acute angle next to or one above the other, and which feed a common extrusion nozzle via a preform die or member having flow channels which extend one above the other. The extruder head also includes a third extruder which is connected to the preform die at a greater angle than are the previously mentioned extruders; this third extruder conveys the mixture for the edge portions.

2. Description of the Prior Art

It is known, and for a long time has also been the customary practice, to cohesively produce multiply profiled webs by uniting the partial flows conveyed from several individual extruders in a common nozzle. This posssibility is advantageously utilized for preforming or preliminary shaping of uncured tread strips for pneumatic vehicle tires. Since resistance to wear is predominately required for the tread surface region, while flexibility and crack resistance are primarily required for the side portions, the tread strips must basically comprise two different elastomer mixtures. The joining of the partial profiled webs in the extruder head, which unites the two extruders, poses considerable problems, which in practice have in general been overcome with known devices (see, for example, German Pat. No. 1 729 599) Kohlepp et al. corresponding to U.S. Pat. No. 3,584,343—Kohlepp et al. dated June 15, 1971 and belonging to the assignee of the present invention. However, the recently generated desire in the tire manufacturing industry for providing the tread strip with relatively narrow edge portions made of a particularly readily bondable mixture involves an additional complication. The great distance between these edge portions proves to be extremely unfavorable with regard to flow dynamics. Despite careful matching of all flow routes to one another using built-in flow retarders, irregularities repeatedly occurred. These irregularities are manifested in the uncured tread strips by poor bonds and by the appearance of delaminations.

An object of the present invention therefore is to make uniform the flow conditions in the common extruder head, to which three extruders are connected, as a prerequisite for the desired flowing together and satisfactory fusing, and hence to make possible the production of tread strips, all of the portions of which have utility.

BRIEF DESCRIPTION OF THE DRAWING

This object, and other objects and advantages of the present invention, will appear more clearly from the following specification in conjunction with the accompanying drawing, in which:

FIG. 1 is a partially sectioned schematic side view of one embodiment of the inventive extruder head, with the innerflow being indicated;

FIG. 1a shows in detail a portion of FIG. 1, and in particular is a section taken along the line Ia—Ia in FIG. 2;

FIG. 2 is a view taken counter to the direction of extrusion of the preform die and its attachment; and FIG. 3 is an enlarged cross-sectional view of an uncured tread strip formed by three extruders.

SUMMARY OF THE INVENTION

The extruder head of the present invention is characterized primarily in that the flow route of the third extruder in the preform die, starting from the connection bore, it first guided as a single connecting channel to a direction-changing angle piece in the central region above or below the flow channels which are associated with the two other extruders, and from there is spilt into two branch channels which span the flow channels, are essentially of equal length, and end in the edge regions in edge channels which lead into the edge portions of the profiled web.

Expediently, not only the connecting channel but also the two branch channels are directed essentially in a straight line and parallel to one another. However, pursuant to variations of the present invention, the two branch channels can also be directed at an obtuse angle relative to one another in the manner of an arrow head, or can also be curved in the manner of an arc. In all cases, it is advantageous to provide each of the branch channels with a cross-sectional area of passage of approximately half of the cross-sectional area passage of the connecting channel.

With the inventive arrangement of the connecting channel and branch channels of the third extruder, it is surprisingly possible to cope with or control the determinative rheological conditions, and hence to provide the basic prerequisites for the production of multi-ply built-up profiled webs or strips which have a uniform composition and in all regions exhibit satisfactory bonding of the various partial flows to one another. The flow guidance of the additional third extruder, which initially appears to be complicated, results in a not readily-to-be-expected uniform material distribution on both edge portions, with the end result being that the previously existing bonding difficulties are also overcome. This favorable effect of the present invention can be repeated at any time independently of changing operating conditions and other external or internal factors.

DESCRIPTION OF PREFERRED EMBODIMENTS

Referring now to the drawing in detail, the extruder head 4 forms the front end of two screw-type extruders 5, 6, which are placed one above the other and at an acute angle to one another. In a known manner, the flow channels 15, 16 of the extruders 5, 6 have a width which increases while the cross-sectional height thereof decreases; in the direction of extrusion, the flow channels 15, 16 increasingly approach one another until, after having passed the preform die 8, the channels merge into one another in the nozzle 9, which imparts the final shape. Offset to the side of the extruders 5, 6 by 90°, a third screw-type extruder 7 is connected to the preform die 8; the extruder 7 feeds directly into a connecting channel 17 which is open toward the outside. The connecting channel 17 extends in a straight line into the core of the preform die 8 to a point above the flow channels 15, 16 in a plane which coincides with the center line of the latter, where the channel 17 turns downwardly by 90° via a short angle piece 17a and splits into two branch channels 27 which span the flow channels 15, 16. In the illustrated embodiment, the branch channels 27 extend parallel to not only the connecting channel 17, but also to the flow channels 15, 16. However, it is also conceivable, and is possible without a negative impact on the effect, to dispose the branch channels 27 so as to extend approximately in the manner of a roof ridge at an obtuse angle to one another, or so as to be symmetrically curved in the manner of an arc. The two branch channels 27 open in the side regions of the flow channels 15, 16 into bores 37, which subsequently merge into the openings in the nozzle 9 which form the edge portions of the profiled webs or strands of material.

The aforementioned extruder head 4 serves for producing tread strips 10 having the composition shown in cross section in FIG. 3. The tread surface portion 105 is placed upon a base portion 106, and both portions are bordered by edge strips 107 which have the cross section of an obtuse triangle. In conformity with specific function thereof within a finished pneumatic tire, each of the three or four portions is formed of a different rubber mixture, with only the edge strips 107 being similar; in a tread strip which is ready to be used for building up a tire, all of the four portions must fixedly adhere to one another. With particular regard to the edge strips, this requirement is fulfilled by the guidance of the connecting channels 17 for the third screw-type extruder 7, and the splitting of the former within the preform die 8 into the two branch channels 27; this guidance is clearly shown in FIG. 2. Another important factor is the matching or coordination of the cross-sectional areas of passage with one another in such a way that the two branch channels 27 taken together have at least nearly the flow capacity of the single connecting channel 17 therewith.

The present invention is, of course, in no way restricted to the specific disclosure of the specification and drawing, but also encompasses any modifications within the scope of the appended claims.

What we claim is:

1. An extruder head to which three extruders are connected as a prerequisite for desired flowing together and satisfactory fusing of material mixtures controlled for producing a flat, cohesive profiled strip from resilient material mixtures having different compositions, said strip having a two-ply central portion, and two edge portions which are similar to one another; said extruder head comprising:
    a first extruder;
    a second extruder which is associated with said first extruder at an acute angle thereto;
    an extrusion nozzle;
    a preform die member which includes two flow channels disposed one above the other and respectively connected to one of said first and second extruders and to said nozzle so that material can be fed from said first and second extruders, via said flow channels, to said extrusion nozzle for said central portion of said profiled strip; and
    also a third extruder connected to said preform die member, which further includes, starting from the point of connection of said third extruder thereto, a single connecting channel which leads to that portion of said preform die member in which said flow channels are disposed one above the other; in this last-mentioned portion of said preform die member, said connecting channel being split into two branch channels which span said flow channels, are essentially of the same length, and respectively end in an edge channel, both of which are connected to said extrusion nozzle so that material can be fed from said third extruder, via said single connecting channel, said branch channels, and said edge channels of said preform die member, to said extrusion nozzle for said edge portions of said profiled strip.

2. An extruder head according to claim 1, in which an angle piece is interposed between, and communicates with, said connecting channel and said branch channels.

3. An extruder head according to claim 2, in which said connecting channel, and said branch channels, essentially extend in straight lines and are disposed parallel to one another.

4. An extruder head according to claim 1, in which the cross-sectional area of passage of each of said branch channels is equal to approximately half of the cross-sectional area of passage of said connecting channel.

* * * * *